(12) United States Patent
Zhang

(10) Patent No.: US 11,205,893 B2
(45) Date of Patent: Dec. 21, 2021

(54) THERMALLY PROTECTED METAL-OXIDE VARISTOR

(71) Applicant: XIAMEN SET ELECTRONICS CO., LTD, Xiamen (CN)

(72) Inventor: Xianggui Zhang, Xiamen (CN)

(73) Assignee: XIAMEN SET ELECTRONICS CO., LTD, Xiamen (CN)

( * ) Notice: Subject to any disclaimer, the term of this patent is extended or adjusted under 35 U.S.C. 154(b) by 0 days.

(21) Appl. No.: 16/960,904

(22) PCT Filed: Mar. 26, 2019

(86) PCT No.: PCT/CN2019/079719
§ 371 (c)(1),
(2) Date: Jul. 9, 2020

(87) PCT Pub. No.: WO2019/205864
PCT Pub. Date: Oct. 31, 2019

(65) Prior Publication Data
US 2020/0335964 A1    Oct. 22, 2020

(30) Foreign Application Priority Data

Apr. 23, 2018  (CN) .......................... 201820587591.0

(51) Int. Cl.
*H02H 5/04* (2006.01)
*H02H 9/04* (2006.01)
*H01H 37/76* (2006.01)

(52) U.S. Cl.
CPC ............ *H02H 5/04* (2013.01); *H01H 37/764* (2013.01); *H02H 9/04* (2013.01)

(58) Field of Classification Search
CPC ................ H01H 37/02; H01H 37/764; H02H 9/04–042; H02H 5/04; H01C 7/10–126
See application file for complete search history.

(56) References Cited

U.S. PATENT DOCUMENTS 9,640,352 B2 * 5/2017 Daum ...................... H01T 1/14

FOREIGN PATENT DOCUMENTS

CN       1953109 A  *  4/2007
CN     208174263 U  * 11/2018 ............. H01C 7/126

OTHER PUBLICATIONS

Translation of CN-208174263-U. Nov. 30, 2018. (Year: 2018).*
Translation of CN-1953109-A. Apr. 25, 2007. (Year: 2007).*

* cited by examiner

*Primary Examiner* — Jared Fureman
*Assistant Examiner* — Christopher J Clark
(74) *Attorney, Agent, or Firm* — Bayramoglu Law Offices LLC

(57) ABSTRACT

A thermally protected metal-oxide varistor is provided, including a disconnecting unit, a first varistor assembly and a second varistor assembly. The first varistor assembly and the second varistor assembly are connected in series through a low-melting-point alloy layer; wherein when the low-melting-point alloy layer is fused, the disconnecting unit acts to cut off the low-melting-point alloy. The two varistors are connected directly through solder joints without any transition connection member. The heat transfer path is reduced to the shortest path, and a faster response is realized compared to conventional products formed by a varistor and a disconnecting unit when abnormal over-current passes. Moreover, the slider functions as a physical separator capable of isolating the two varistors after the solder joints are fused, which further diminishes the risk of fire occurrence caused by the failure of instantly blocking current by the disconnecting unit when the varistor breaks down by over-current.

18 Claims, 8 Drawing Sheets

THERMALLY PROTECTED METAL-OXIDE VARISTOR

CROSS REFERENCE TO THE RELATED APPLICATIONS

This application is the national phase entry of International Application No. PCT/CN2019/079719, filed on Mar. 26, 2019, which is based upon and claims priority to Chinese Patent Application No. 201820587591.0, filed on Apr. 23, 2018, the entire contents of which are incorporated herein by reference.

TECHNICAL FIELD

The present disclosure relates to a varistor for surge protection devices, and more specifically relates to a novel thermally protected metal-oxide varistor.

BACKGROUND

Photovoltaic solar panels are located mostly in open areas or on the surfaces of buildings, thus being exposed to lightning strikes and requiring large amounts of surge protection devices to be installed therewith. With the development of photovoltaic power generation industry, the system rated voltage has been increased from 750 V to 1500 V, placing higher requirements on the disconnecting unit in the case of surge protection device failure. Currently, surge protection devices in the photovoltaic industry are all formed by a varistor and a disconnecting unit connected in series. During use, there is still a risk of fire hazard due to the failure of instantly blocking the high-voltage direct current by the disconnecting unit when the varistor is broken down.

SUMMARY

In order to solve the above-mentioned problems, the technical purpose of the present disclosure is to provide a novel thermally protected metal-oxide varistor, which is able to realize rapid disconnection when abnormal current passes therethrough, thus improving safety.

The present disclosure is implemented by the following technical solutions.

A novel thermally protected metal-oxide varistor includes a disconnecting unit, a first varistor assembly and a second varistor assembly. The first varistor assembly and the second varistor assembly are connected in series through a low-melting-point alloy layer; when the low-melting-point alloy layer is fused, the disconnecting unit acts to cut off the low-melting-point alloy, thereby disconnecting the first varistor assembly from the second varistor assembly and disconnecting the circuit.

Further, the disconnecting unit includes an inner frame, and a slider and a spring both placed inside the inner frame. One end of the spring is pressed against the inner frame and in a compressed state. The slider is fixed by the low-melting-point alloy layer, the spring and the inner frame. When the low-melting-point alloy layer is fused, the slider, driven by a rebound force of the spring, moves and cuts off the low-melting-point alloy layer to separate the first varistor assembly from the second varistor assembly.

Further, a first convex stand is arranged on the first varistor assembly, and the first convex stand is provided with a first upper bottom and a first inclined surface at an angle of 90-180 degrees to the first upper bottom surface. The second varistor assembly is provided with a second convex stand, and the second convex stand is provided with a second upper bottom surface and a second inclined surface at an angle of 90-180 degrees to the second upper bottom surface. The low-melting-point alloy layer is provided between the first upper bottom surface and the second upper bottom surface to connect the first convex stand and the second convex stand. One end of the slider is pressed against the first inclined surface, the second inclined surface and the low-melting-point alloy layer, and the other end is pressed against the spring.

Due to the first inclined surface and the second inclined surface, when the low-melting-point alloy is fused, the slider, driven by the rebound force of the spring, applies forces on the first convex stand and the second convex stand to separate them away from each other, thus accelerating the cut-off of the low-melting-point alloy layer.

Further, the novel thermally protected metal-oxide varistor includes a teleindication assembly, wherein the teleindication assembly includes a first teleindication electrode, a second teleindication electrode and a stopper. When the disconnecting unit functions, the first teleindication electrode gets rid of the restriction by the stopper and is disconnected from the second teleindication electrode for sending a signal.

Further, the first varistor assembly includes a first varistor extraction electrode, a first varistor chip, and a first varistor series electrode. The second varistor assembly includes a second varistor extraction electrode, a second varistor chip, and a second varistor series electrode. The first convex stand is arranged on the first varistor series electrode. The second convex stand is arranged on the second varistor series electrode.

Further, the novel thermally protected metal-oxide varistor includes a first extraction electrode and a second extraction electrode respectively placed on both sides of the inner frame. The first extraction electrode is connected to the first varistor extraction electrode, and the second extraction electrode is connected to the second varistor extraction electrode.

Further, two springs are provided, and the two springs are located on both sides of the first varistor assembly and the second varistor assembly.

Further, the slider slides left and right or up and down under the rebound forces of the springs.

Further, the novel thermally protected metal-oxide varistor includes a housing, wherein the housing is provided with a viewing window. The housing and inner frame form an isolated and insulated cavity for covering exposed electrical bodies.

The housing mates with the inner frame to form an insulated cavity covering exposed live electrical bodies.

The advantages of the present disclosure at least include:

The two varistors in the present disclosure are connected directly through solder joints without any transition connection member. The heat transfer path is reduced to the shortest, and a faster response is realized compared to conventional products formed by a varistor and a disconnecting unit when abnormal over-current passes. Moreover, the slider functions as a physical separator capable of isolating the two varistors after the solder joints are fused, which further diminishes the risk of fire occurrence caused by the failure of instantly blocking current by the disconnecting unit when the varistor is breakdown by over-current.

The above description is only an overview of the technical solution of the present disclosure, and intended to provide a clearer understanding of the present disclosure so that the present disclosure can be carried out in accordance with the contents of the description. In order to make the above-mentioned and other purposes, features and advantages of the present disclosure more clearly understood, the embodiments of the present disclosure are presented hereinafter.

BRIEF DESCRIPTION OF THE DRAWINGS

For a clearer description of the embodiments of the present disclosure or the technical solutions of the prior art, the drawings required for the description of the embodiments or the prior art are briefly introduced. It is clear that the drawings described below are some embodiments of the present disclosure. For those skilled in the art, other drawings can be obtained from these drawings without creative work.

Figure 1:
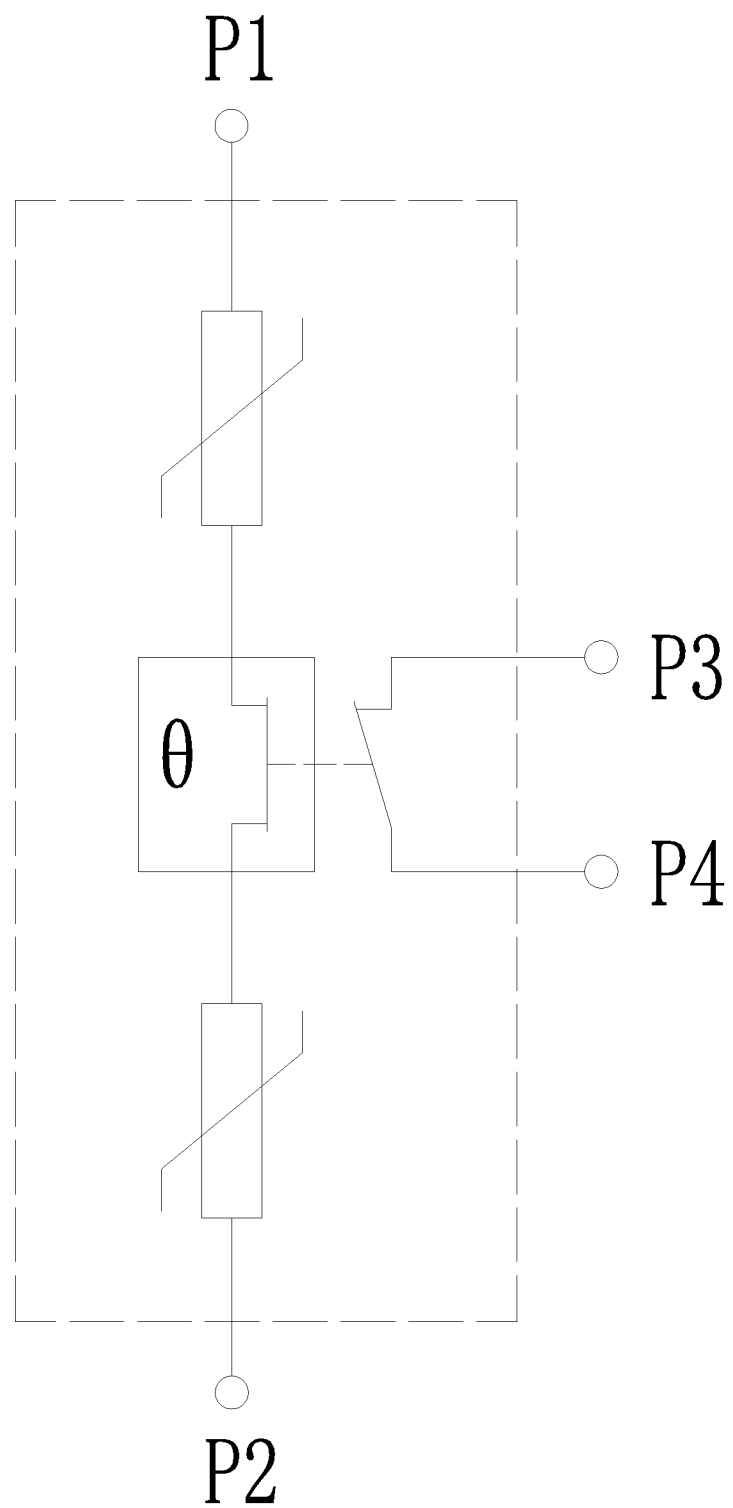
FIG. 1 is a schematic diagram showing the principle of the present disclosure.
Figure 2:
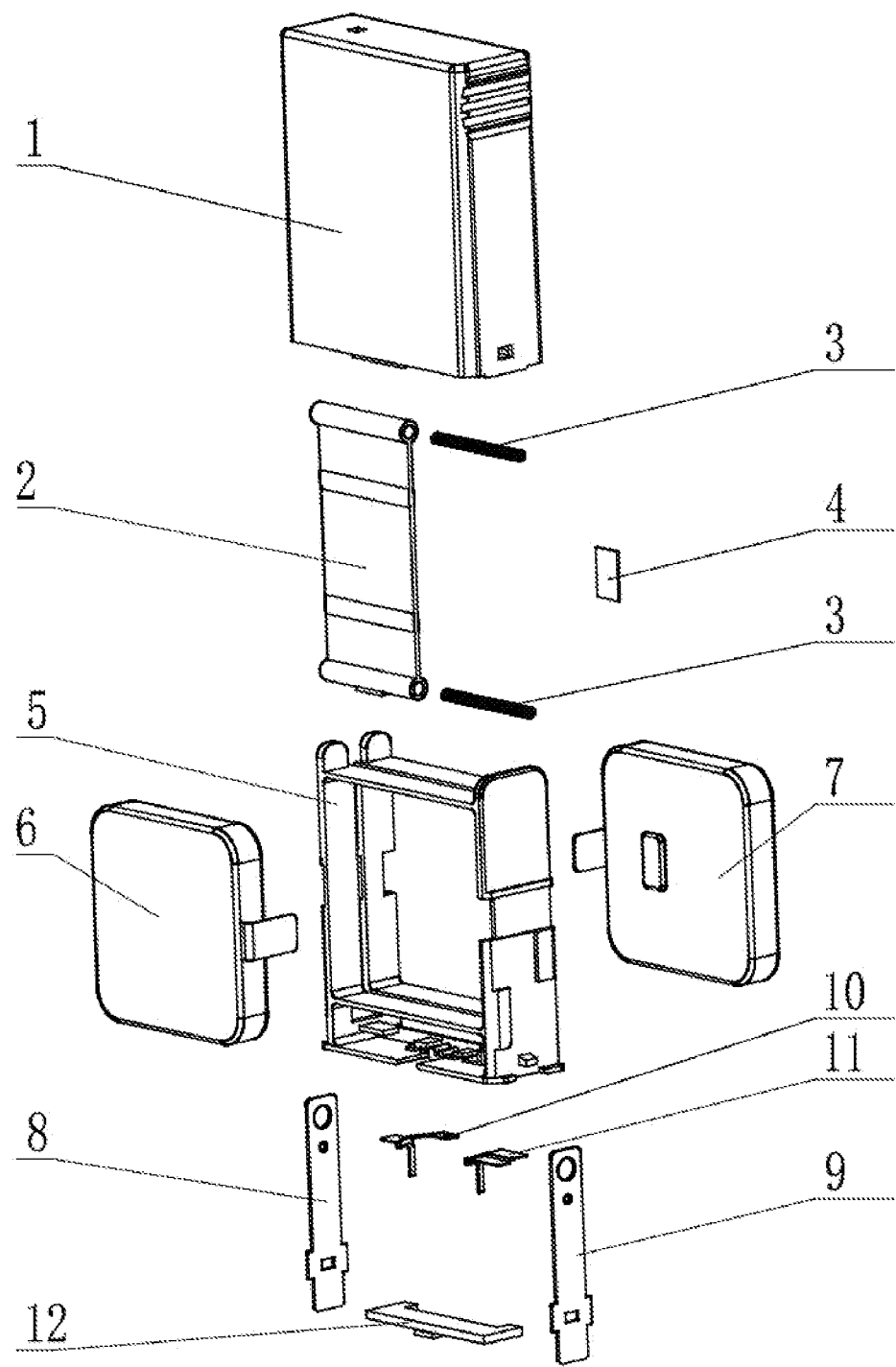
FIG. 2 is an exploded view showing embodiment 1 of the present disclosure.
Figure 3:
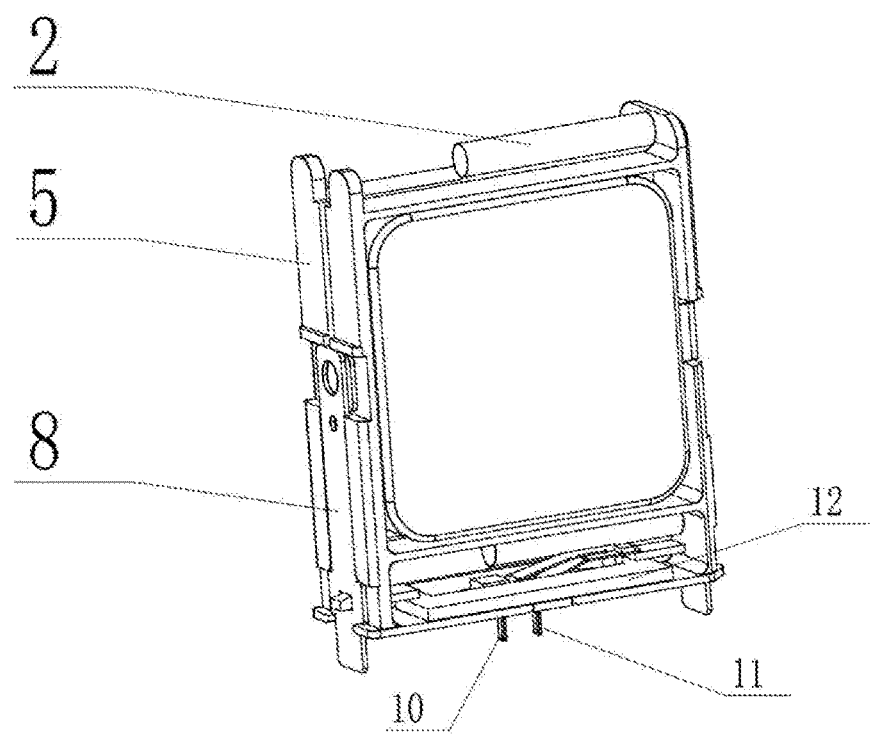
FIG. 3 is a schematic diagram showing the position of the slider before failure of embodiment 1 of the present disclosure.
Figure 4:
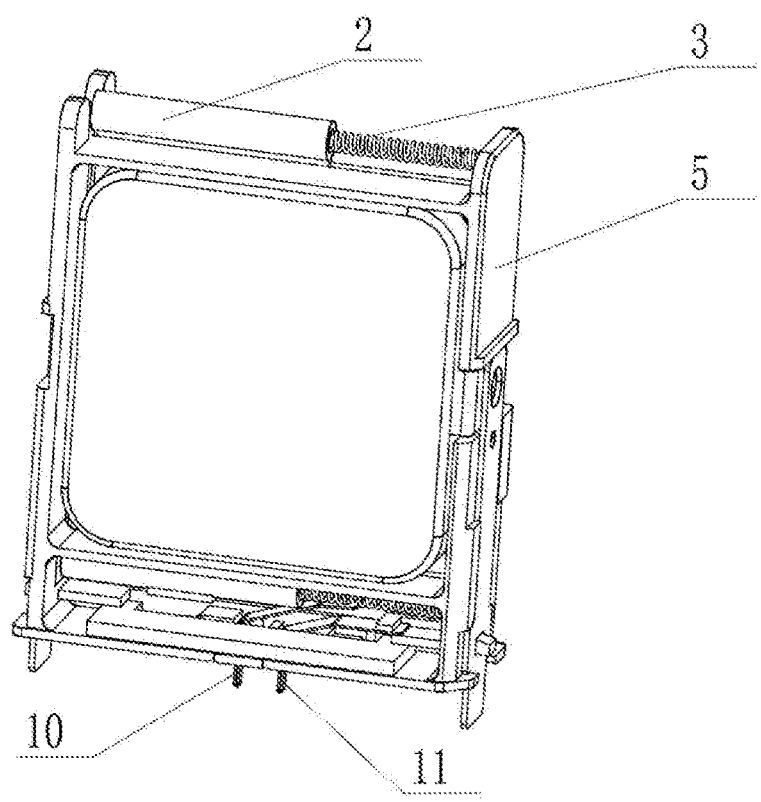
FIG. 4 is a schematic diagram showing the position of the slider after failure of embodiment 1 of the present disclosure.
Figure 5:
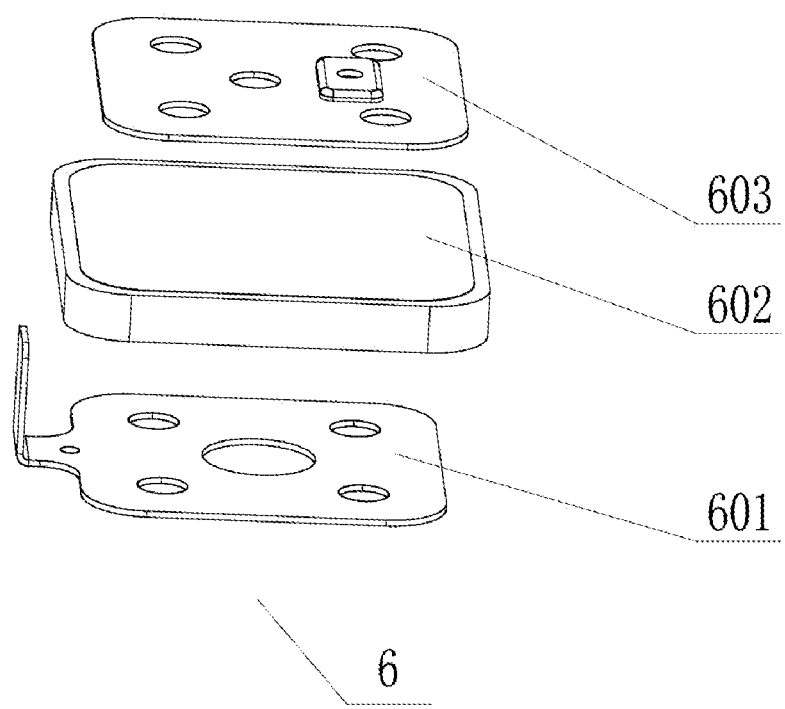
FIG. 5 is an exploded view showing the first varistor assembly according to embodiment 1 of the present disclosure.
Figure 6:
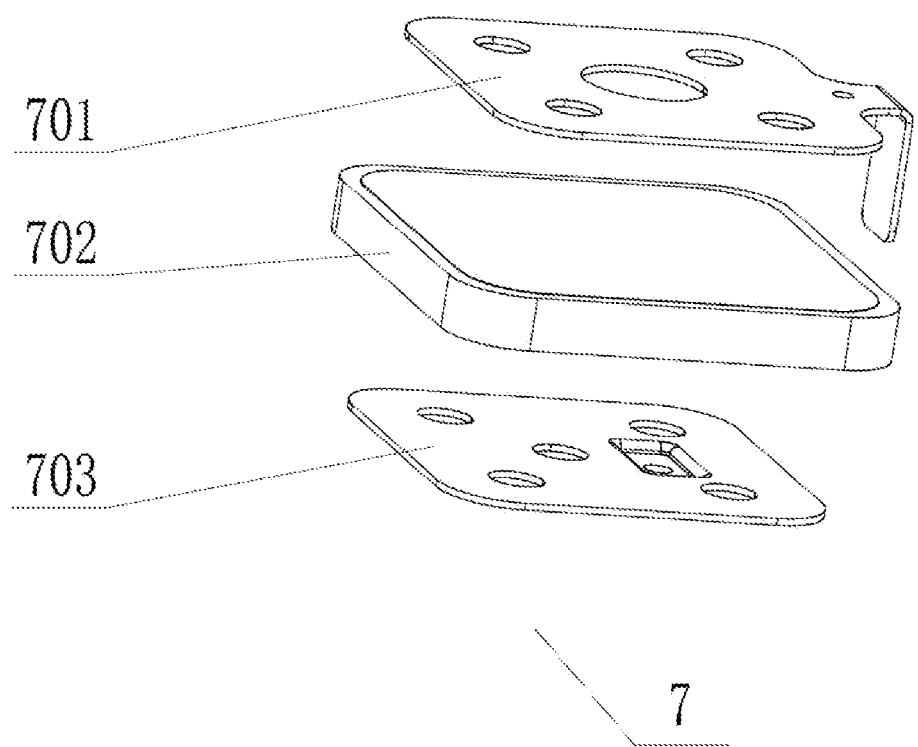
FIG. 6 is an exploded view showing the second varistor assembly according to embodiment 1 of the present disclosure.

In the drawings:
1 housing
2 slider
3 spring
4 low-melting-point alloy layer
5 inner frame
6 first varistor assembly
601 first varistor extraction electrode
602 first varistor chip
603 first varistor series electrode
604 first convex stand
6041 first upper bottom surface
6042 first inclined surface
7 second varistor assembly
701 second varistor extraction electrode
702 second varistor chip
703 second varistor series electrode
704 second convex stand
7041 second upper bottom surface
7042 second inclined surface
8 second extraction electrode
9 first extraction electrode
10 first teleindication electrode
11 second teleindication electrode
12 stopper

DETAILED DESCRIPTION OF THE EMBODIMENTS

The present disclosure is described in more detail below in the form of embodiments with drawings. Only some embodiments are presented, and the present disclosure can be implemented by a variety of forms in practical application and shall not be limited to the embodiments presented below. The purpose of presenting the embodiments is to bring better understanding of the present disclosure.

An apparatus includes a first assembly having current-voltage nonlinear characteristic and over-voltage protection function, a second assembly having current-voltage nonlinear characteristic and over-voltage protection function, a conductive element connecting the first assembly and the second assembly, and a disconnecting unit between the first assembly and the second assembly. When the circuit works normally, the conductive element connecting the first assembly and the second assembly is in an on state. When an abnormal current passes through the first assembly and/or the second assembly under an abnormal over-voltage of the system and a large amount of heat is generated, the conductive element is removed from the first assembly and the second assembly, thereby cutting off the current. There are several ways in which the conductive element is removed from the first assembly and the second assembly to cut off the current. One way is to create a force according to the passed over-current to push the conductive element away. Another way is to produce the conductive element using a specific material so that the conductive element is fused when over-current causes overheating, after the conductive element is fused, the current is cut off. Alternatively, an insulation member can be arranged between the first assembly and the second assembly to avoid over-current in the first assembly and the second assembly. Optionally, the disconnecting unit is configured to cut off the conductive element, so that the current from the first assembly to the second assembly is cut off. The cut-off of the current eliminates the possibility of overheating conditions including, but is not limited to, fire occurrence due to heating of the first assembly and/or the second assembly.

Embodiment 1

As shown in FIG. 1-FIG. 8, a novel thermally protected metal-oxide varistor includes the housing 1, the slider 2, the springs 3, the low-melting-point alloy layer 4, the inner frame 5, the first varistor assembly 6, the second varistor assembly 7, the second extraction electrode 8, the first extraction electrode 9, and a teleindication assembly composed of the first teleindication electrode 10, the second teleindication electrode 11 and the stopper 12. The inner frame 5 supports the first varistor assembly 6, the second varistor assembly 7, the second extraction electrode 8, the first extraction electrode 9, the slider 2, the springs 3, and the teleindication assembly.

The first varistor assembly 6 includes the first varistor chip 602, the first varistor extraction electrode 601, the first varistor series electrode 603, and an encapsulation layer. The first varistor extraction electrode 601 is connected to one side of the first varistor chip 602 and has an exposed bent pin. The first varistor series electrode 603 is connected to the other side of the first varistor chip 602, and the first varistor series electrode 603 has a convex stand which is exposed outside the encapsulation layer. The encapsulation layer is an insulated coating and covers the body of the first varistor chip 602, the first varistor extraction electrode 601, and the first varistor series electrode 603.

The second varistor assembly 7 includes the second varistor chip 702, the second varistor extraction electrode 701, and the second varistor series electrode 703, and an encapsulation layer. The second varistor extraction electrode 701 is connected to one side of the second varistor chip 702 and has an exposed bent pin. The second varistor series electrode 703 is connected to the other side of the second varistor chip 702, and the second varistor series electrode 703 has a convex stand which is exposed outside the encapsulation layer. The encapsulation layer is an insulated coating and covers the body of the second varistor chip 702, the second varistor extraction electrode 701 and the second varistor series electrode 703.

The first extraction electrode 9 is connected to the first varistor extraction electrode 601 of the first varistor assembly 6. The second extraction electrode 8 is connected to the second varistor extraction electrode 701 of the second varistor assembly 7. The first extraction electrode 9 and the second extraction electrode 8 are installed in the corresponding positions on the inner frame 5.

Figure 7:
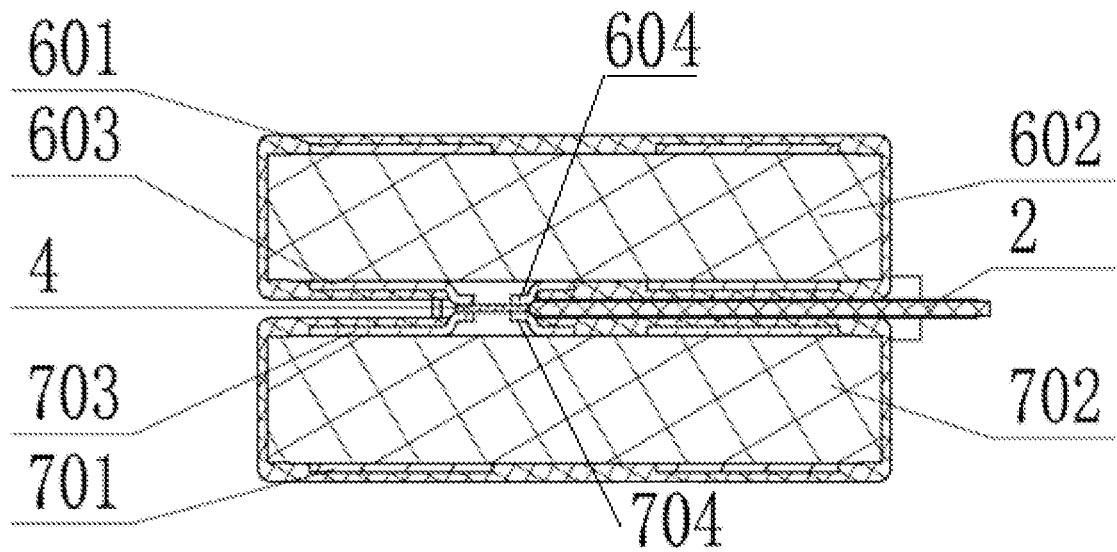
FIG. 7 is a cross-sectional view of embodiment 1 of the present disclosure.
Figure 8:
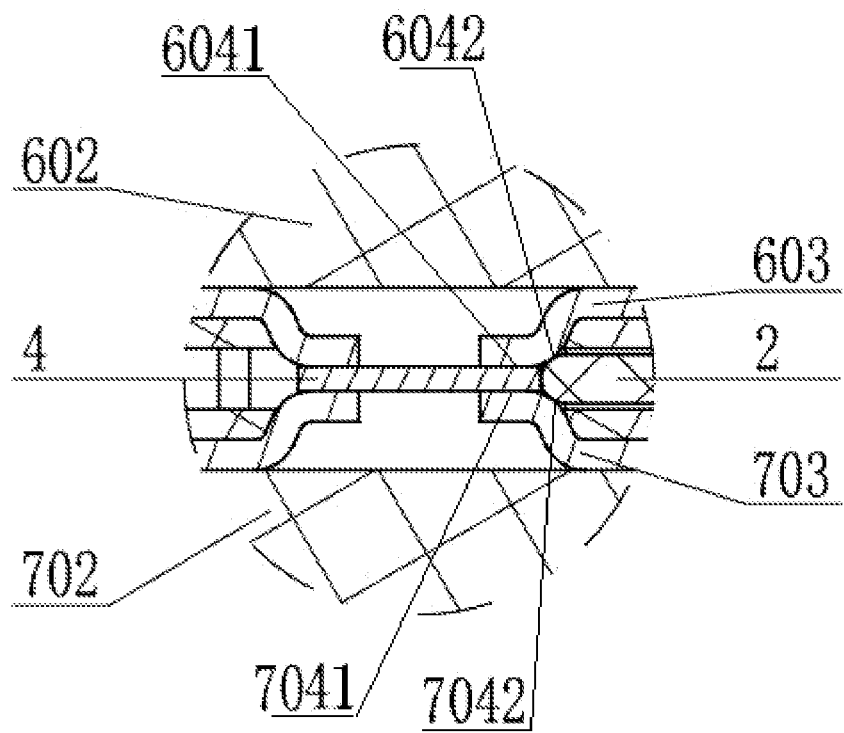
FIG. 8 is a partial enlarged view showing the convex stand in FIG. 7.

The low-melting-point alloy layer 4 is arranged on convex stands of the first varistor series electrode 603 and the second varistor series electrode 703 for a series connection between the first varistor assembly 6 and the second varistor assembly 7. The slider 2 is mounted between the first varistor assembly 6 and the second varistor assembly 7. The two springs 3 are respectively arranged on the upper and lower sides of the first varistor assembly 6 and the second varistor assembly 7, and assembled between the hollow portions of the slider 2 and the inner frame 5 in a compressed state. As shown in FIG. 7 and FIG. 8, the first convex stand 604 is provided on the first varistor series electrode 603, and the first convex stand 604 has the first upper bottom surface 6041 and the first inclined surface 6042 at an angle of 90-180 degrees to the first upper bottom surface 6041. The second varistor series electrode 703 is provided with the second convex stand 704, and the second convex stand 704 has the second upper bottom surface 7041 and the second inclined surface 7042 at an angle of 90-180 degrees to the second upper bottom surface. The low-melting-point alloy layer 4 is provided between the first upper bottom surface 6041 and the second upper bottom surface 7041 to connect the first convex stand 604 and the second convex stand 704. One end of the slider 2 is pressed against the first inclined surface 6042, the second inclined surface 7042 and the low-melting-point alloy layer 4, and the other end is pressed against the springs 3. When the varistors generate a large amount of heat due to the passing of over-current, the low-melting-point alloy layer 4 is fused, the first convex stand 604 is disconnected with the second convex stand 704. Due to the presence of the first inclined surface 6042 and the second inclined surface 7042, the slider 2, driven by rebound forces of the springs, applies forces on the first convex stand 604 and the second convex stand 704 to separate them away from each other, thereby cutting off the low-melting-point alloy layer 4 between the first varistor assembly 6 and the second varistor assembly 7, separating the first varistor assembly 6 from the second varistor assembly 7, and achieving the purpose of cutting off current through the circuit and protecting the varistors.

The teleindication assembly is composed of the first teleindication electrode 10, the second teleindication electrode 11 and the stopper 12. In a normal condition, the first teleindication electrode 10 is pressed down under the slider 2 to form a normally closed node with the second teleindication electrode 11. When the varistor is abnormal, the slider 2 moves in the spring stretching direction, and the first teleindication electrode 10 pops up, forming a normally open node with the second teleindication electrode 11, so that a state switch is achieved.

The housing 1 is assembled to the inner frame to form an isolated and insulated cavity for covering exposed electrical bodies. The housing 1 can be further provided with a window at a certain position to observe the slide and determine if the varistors have failed.

Embodiment 2

Figure 9:
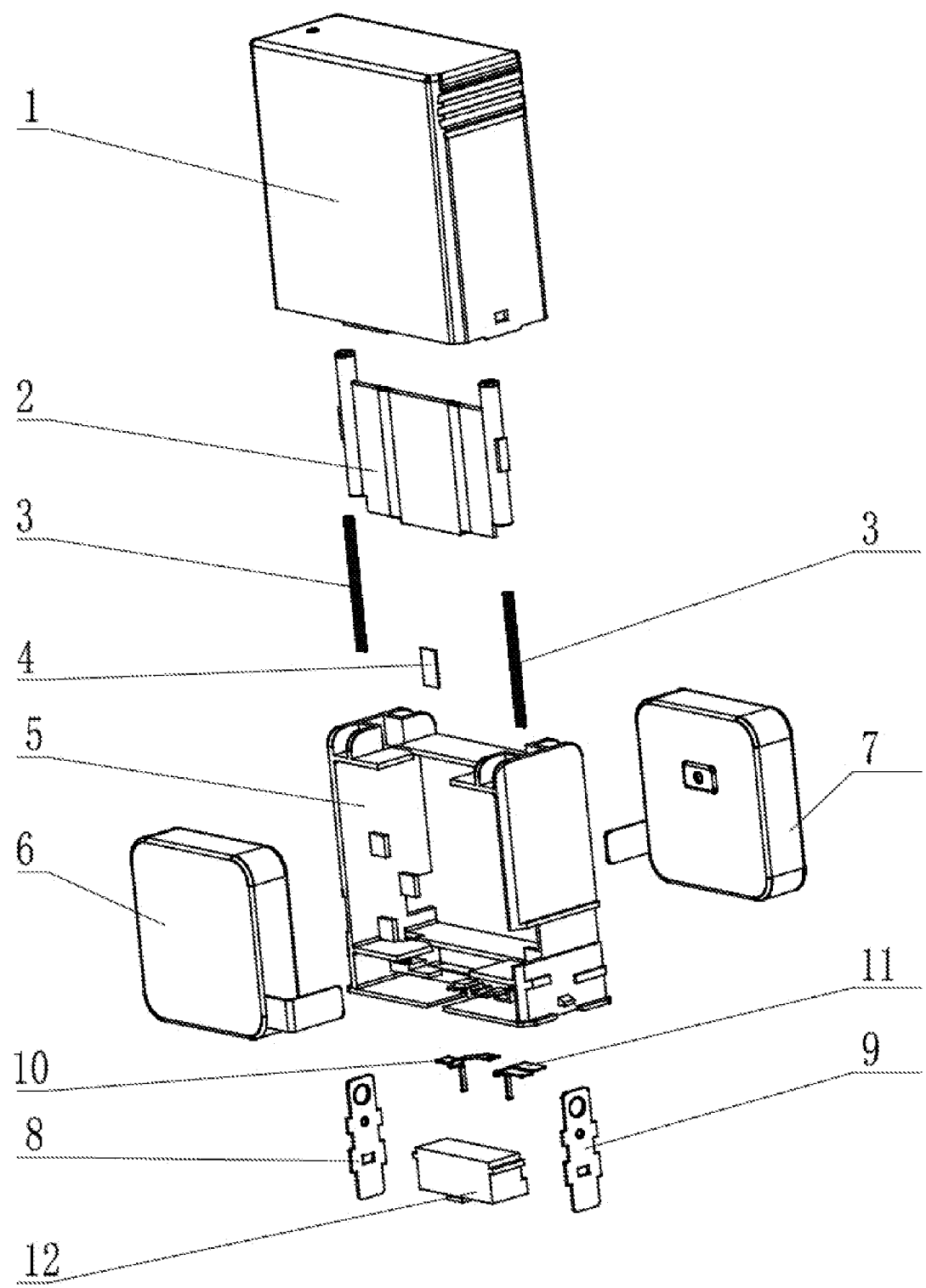
FIG. 9 is an exploded view of embodiment 2 of the present disclosure.
Figure 10:
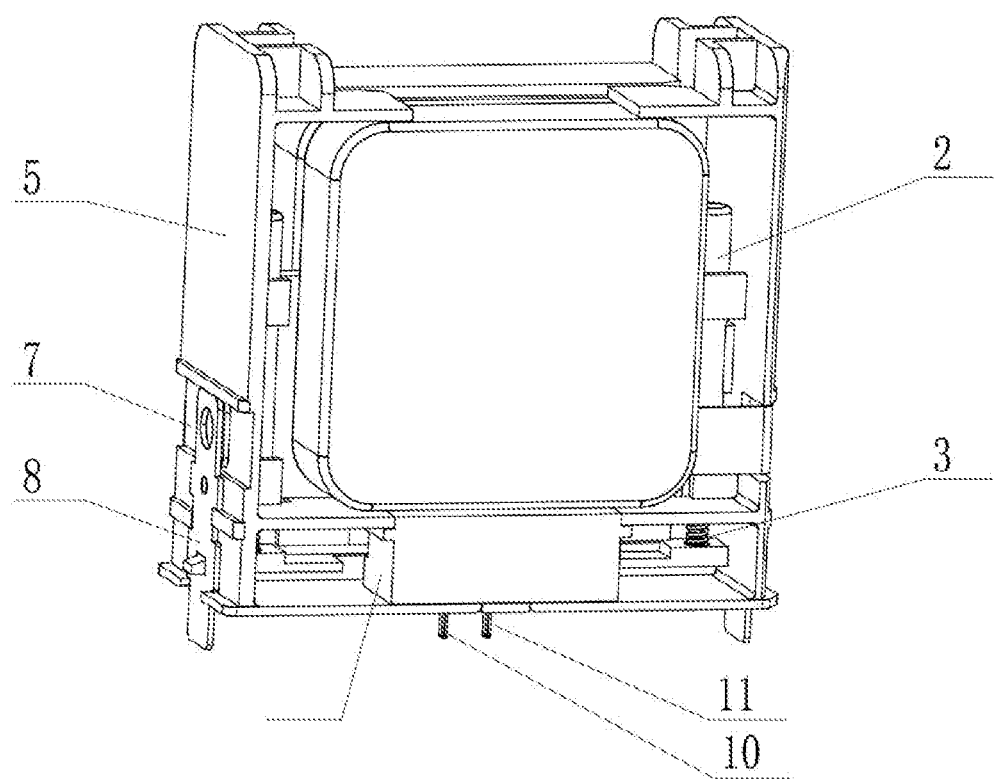
FIG. 10 is a schematic diagram showing the position of the slider before failure of embodiment 2 of the present disclosure.
Figure 11:
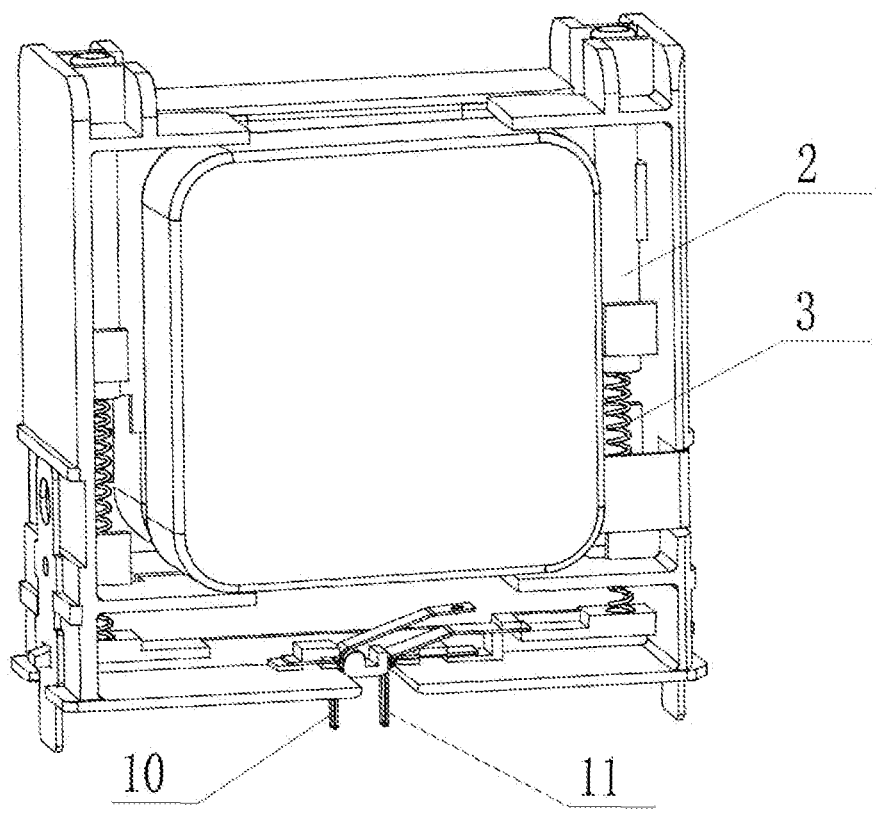
FIG. 11 is a schematic diagram showing the position of the slider after failure of embodiment 2 of the present disclosure.

As shown in FIGS. 9-11, the only difference between embodiment 2 and embodiment 1 is that the springs 3 are respectively arranged on the left and right sides of the first varistor assembly 6 and the second varistor assembly 7, and assembled between the hollow portions of the slider 2 and the inner frame 5 in a compressed state. When the varistors generate a large amount of heat due to the passage of over-current, the low-melting-point alloy layer 4 is fused, and the slider 2, driven by rebound forces of the springs 3, moves upward and downward to cut off the low-melting-point alloy layer 4 between the first varistor assembly 6 and the second varistor assembly 7, and separate the first varistor assembly 6 from the second varistor assembly 7 to achieve the purpose of cutting off current through the circuit and protecting the varistors.

It should be understood that the embodiments of the present disclosure are only intended to give a clear description of the present disclosure, rather than restrict the present disclosure. Although the present disclosure is described in detail in the light of the embodiments, for those skilled in the art, other variations or modifications based on the above description, or equivalent replacements of some of the technical features are possible. Hence, the variations, modifications and equivalent replacements within the spirit and principles of the present disclosure shall fall within the protection scope of the present disclosure.

What is claimed is:

1. A thermally protected metal-oxide varistor, comprising a disconnecting unit, a first varistor assembly, and a second varistor assembly; wherein the first varistor assembly and the second varistor assembly are connected in series through a low-melting-point alloy layer; wherein when the low-melting-point alloy layer is fused, the disconnecting unit acts to cut off the low-melting-point alloy layer, and the disconnecting unit disconnects the first varistor assembly from the second varistor assembly.

2. The thermally protected metal-oxide varistor according to claim 1, wherein the disconnecting unit comprises an inner frame, a slider and at least one spring, and the slider and the at least one spring are both placed inside the inner frame; a first end of each spring of the at least one spring is pressed against the inner frame, a second end of each spring of the at least one spring is pressed against the slider, and the at least one spring is in a compressed state; the slider is fixed by the low-melting-point alloy layer, the at least one spring and the inner frame; wherein when the low-melting-point alloy layer is fused, the slider is driven by a rebound force of the at least one spring to move and cut off the low-melting-point alloy layer, and the slider separates the first varistor assembly from the second varistor assembly.

3. The thermally protected metal-oxide varistor according to claim 2, wherein a first convex stand is arranged on the first varistor assembly, the first convex stand is provided with a first upper bottom surface and a first inclined surface, and the first inclined surface is at an angle of 90-180 degrees to the first upper bottom surface; the second varistor assembly is provided with a second convex stand, the second convex stand is provided with a second upper bottom surface and a second inclined surface, and the second inclined surface is at an angle of 90-180 degrees to the second upper bottom surface; the low-melting-point alloy layer is arranged between the first upper bottom surface and the second upper bottom surface to connect the first convex stand and the second convex stand; a first end of the slider is pressed against the first inclined surface, the second inclined surface and the low-melting-point alloy layer, and a second end of the slider is pressed against the at least one spring.

4. The thermally protected metal-oxide varistor according to claim 3, wherein the first varistor assembly comprises a first varistor extraction electrode, a first varistor chip, and a first varistor series electrode; the second varistor assembly comprises a second varistor extraction electrode, a second varistor chip, and a second varistor series electrode; the first convex stand is arranged on the first varistor series electrode; the second convex stand is arranged on the second varistor series electrode.

5. The thermally protected metal-oxide varistor according to claim 4, further comprising a first extraction electrode and a second extraction electrode, wherein the first extraction electrode and the second extraction electrode are respectively placed on both sides of the inner frame; the first extraction electrode is connected to the first varistor extraction electrode, and the second extraction electrode is connected to the second varistor extraction electrode.

6. The thermally protected metal-oxide varistor according to claim 3, further comprising a teleindication assembly, wherein the teleindication assembly comprises a first teleindication electrode, a second teleindication electrode and a stopper; wherein when the disconnecting unit functions, the first teleindication electrode frees a restriction of the stopper and the first teleindication electrode is disconnected from the second teleindication electrode for sending a signal.

7. The thermally protected metal-oxide varistor according to claim 3, wherein a quantity of the at least one spring is two, and the two springs are respectively located on both sides of the first varistor assembly and the second varistor assembly.

8. The thermally protected metal-oxide varistor according to claim 3, wherein the slider slides left and right or slides up and down under the rebound force of the at least one spring.

9. The thermally protected metal-oxide varistor according to claim 3, further comprising a housing, wherein the housing is provided with a viewing window.

10. The thermally protected metal-oxide varistor according to claim 9, wherein the housing and the inner frame form an isolated and insulated cavity for covering exposed electrical bodies.

11. The thermally protected metal-oxide varistor according to claim 2, wherein a quantity of the at least one spring is two, and the two springs are respectively located on both sides of the first varistor assembly and the second varistor assembly.

12. The thermally protected metal-oxide varistor according to claim 2, wherein the slider slides left and right or slides up and down under the rebound force of the at least one spring.

13. The thermally protected metal-oxide varistor according to claim 2, further comprising a teleindication assembly, wherein the teleindication assembly comprises a first teleindication electrode, a second teleindication electrode and a stopper; wherein when the disconnecting unit functions, the first teleindication electrode frees a restriction of the stopper and the first teleindication electrode is disconnected from the second teleindication electrode for sending a signal.

14. The thermally protected metal-oxide varistor according to claim 2, further comprising a housing, wherein the housing is provided with a viewing window.

15. The thermally protected metal-oxide varistor according to claim 14, wherein the housing and the inner frame form an isolated and insulated cavity for covering exposed electrical bodies.

16. The thermally protected metal-oxide varistor according to claim 1, further comprising a teleindication assembly, wherein the teleindication assembly comprises a first teleindication electrode, a second teleindication electrode and a stopper; wherein when the disconnecting unit functions, the first teleindication electrode frees a restriction of the stopper and the first teleindication electrode is disconnected from the second teleindication electrode for sending a signal.

17. The thermally protected metal-oxide varistor according to claim 1, further comprising a housing, wherein the housing is provided with a viewing window.

18. The thermally protected metal-oxide varistor according to claim 17, wherein the housing and an inner frame form an isolated and insulated cavity for covering exposed electrical bodies.

* * * * *